April 26, 1927.

W. W. DECKER, JR 1,625,847

CULINARY VESSEL

Filed Feb. 2, 1925

Inventor:
William W. Decker Jr
By Luther Johns Atty.

Patented Apr. 26, 1927.

1,625,847

UNITED STATES PATENT OFFICE.

WILLIAM W. DECKER, JR., OF CHICAGO, ILLINOIS.

CULINARY VESSEL.

Application filed February 2, 1925. Serial No. 6,177.

These improvements relate to culinary devices ordinarily known as kettles and pans intended to be set upon a stove or other heating unit. One object is to provide a construction whereby the substantially plane character of the bottom wall will be preserved when the device is in use, and another is to provide a construction for the cover element whereby the heat within the container is better preserved. Each of these features and the cooperation of both of them increases the efficiency of the device.

While it is desirable to maintain the bottom wall of such vessels substantially plane, even where the vessel is used on a gas or coal stove, the importance of this is greatly increased in connection with culinary devices adapted to be used with an electric heating unit having a normally horizontal plate of substantially the diameter of the cooking vessel to be used with it. These electric heating units are made in various sizes, and the various pots, kettles and pans to be used with them respectively are customarily provided with a common diameter suitable for use on the particular unit, the capacity of one such vessel over another being increased by increasing its height. In the electric heating unit it is contemplated that the heat for cooking shall be supplied directly to the bottom of the vessel, and practically no dependence is had upon such heat as may rise from the unit and play upon the sides of the vessel. It is therefore highly important that the bottom wall of the vessel should rest flat upon the top surface of the heating unit so that the heat may be conducted to such bottom wall through the closest contact possible. The present improvements have been made especially with a view to increasing the efficiency of such culinary vessels as are designed to be used with such electric or other heating units depending for their efficiency upon conduction of the heat rather than upon radiation.

Figure 1:
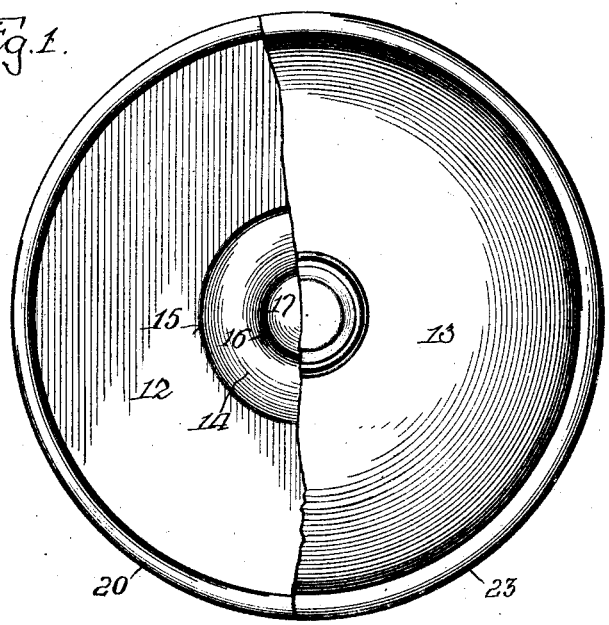
Figure 2:
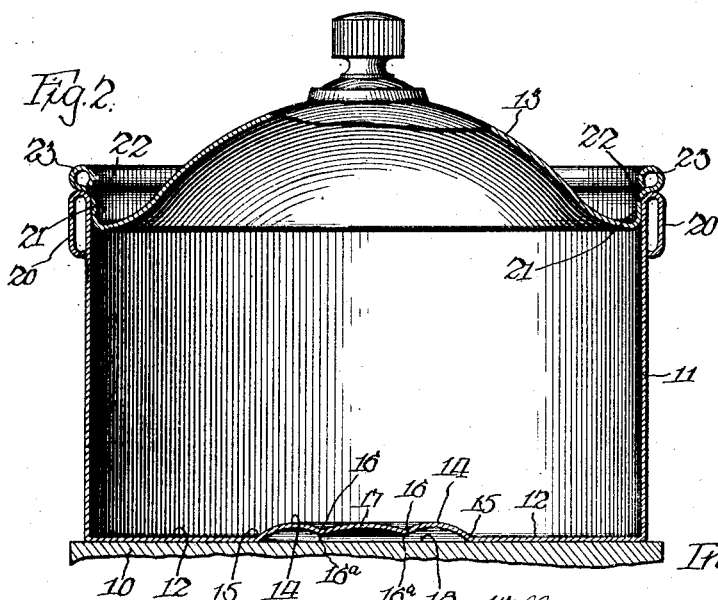

In the accompanying drawings Figure 1 is a top view of a culinary device of the character described with a portion of the cover member broken away; and Fig. 2 is a medial vertical section through the device of Fig. 1, with the upper portion of the lid member shown in full.

In Fig. 2 the device is shown as resting upon what may be considered the horizontal and flat hot plate of an electric heating unit designated 10. The vessel has continuous annular side walls 11, a bottom wall having a relatively large plane portion 12, and a cover member 13. The body of the vessel and of the lid may be considered as being formed of sheet metal, for instance aluminum.

The bottom wall is preferably substantially plane throughout all of its area except for such a relatively small portion thereof as may be formed to yield in the upward direction under the strains of expansion to preserve the substantially plane character of the major portion of the bottom wall when heated, and this yielding portion is preferably centrally arranged. In the form illustrated I provide an annular upstanding corrugation 14 in the bottom wall near the center thereof, the corrugation having an outer margin at 15 merging into the plane wall 12, and having an inner margin at 16 shown as being also the outer margin of another upstanding or raised portion 17, this raised portion 17 being shown in the form of a small and shallow segment of a sphere, but the invention is not limited to such shape.

It is particularly to be noted that the downwardly extending annular ridge 16ª between the corrugation 14 and the other upstanding portion 17 is spaced from the plane 18 common to the lower surface of the bottom wall 12 and the top surface of the heating unit 10. In practice if this spacing be about equal to the thickness of the metal forming the bottom wall 12 it will suffice. The object of having this ridge 16ª above the plane of the bottom and therefore above the lines of expansion pressures is to insure the upward yielding of a relief area in the bottom when expansion strains due to heat are communicated to the relief portion.

I am aware that heretofore corrugations have been suggested for the bottom wall of culinary vessels, and in one instance a separate member has been suggested having corrugations intended to prevent buckling of the bottom wall. See the patent to Mulford, et al, No. 1,461,366, of July 10, 1923, showing a bottom which is not plane at any portion thereof. A construction would not be effective for the present purpose wherein the depending ridges between the corrugations are on the plane of the bottom, for in such case the expansion of the bottom forces the depending ridges below the general plane of the bottom and provides a generally rounded lower surface on which the vessel may rock.

An important feature of the construction illustrated herein is in the fact that although a relatively small portion of the bottom wall is actually out of contact with the hot plate of the heating unit, this small portion is in the form of a pocket or pockets substantially close to the hot plate and substantially sealed about its edges by the surrounding flat wall 12, and therefore all or substantially all of the heat radiated into the pocket or pockets is taken up by the bottom wall portions thereat. It is further pointed out that the construction illustrated in this respect is one easy for the housewife to maintain sanitary and clean.

A second feature of improvement resides in the cover and about the margin thereof. It will be noted from Fig. 2 that a downwardly turned bead 20 is formed at the upper margin of the side wall 11 and that the cover 13 is formed with an upstanding annular part 21 adapted to fit snugly within the vessel at its upper margin; that there is an annular portion 22 which flares outwardly and overlies the bead 20 with a snug fit, and that an annular bead 23 is formed upon the rim of the cover in such manner that the bead 23 overlies the bead 20. I am aware that covers have heretofore been made in which a flange portion as 21 extends upward beyond the side wall bead and is then turned outwardly, downwardly and inwardly to form a bead which rests upon the side wall bead. The patent to Paquette, No. 1,260,794, of March 26th, 1918, may be referred to in this connection.

According to the present improvements a much tighter fit can be made between the cover and the vessel side walls, thus saving heat within the container and cooperating to produce the desired results, a feature of much importance in connection with electrical heating units wherein it is peculiarly desirable from the standpoint of cost as well as from other considerations to utilize as many as possible of the heat units developed.

In view of the teaching herein as to the principles employed it will be apparent to those skilled in the art that various departures may be made from what is herein specifically illustrated and described without departing from the spirit of the improvements set forth, and all such changes and modifications are contemplated by me as fall within the scope of the appended claims.

I claim:

1. A culinary vessel of the character described having a substantially large bottom wall plane on radial lines extending inward to a substantially small portion about the centre, said central portion being circumferentially defined by a shallow stress-relieving formation upstanding above the inner surface of the bottom and adapted to have its circumferential margin yield radially inward under expansion stresses in the outer plane portion of the bottom.

2. The combination of claim 1 hereof in which said stress-relieving formation comprises an upstanding annular corrugation with the inner margin thereof above the general plane of the lower surface of the bottom wall.

3. The combination of claim 1 hereof in which said stress-relieving formation comprises an upstanding annular corrugation and a central convex portion defined marginally by the inner margin of said corrugation, the inner margin of said corrugation and the outer margin of said central convex portion being above the general plane of the lower surface of the bottom wall.

WILLIAM W. DECKER, Jr.